United States Patent
Okazaki et al.

(10) Patent No.: US 10,689,022 B2
(45) Date of Patent: Jun. 23, 2020

(54) STEERING WHEEL GRIP DETECTION DEVICE

(71) Applicant: Panasonic Intellectual Property Management Co., Ltd., Osaka (JP)

(72) Inventors: Yuta Okazaki, Osaka (JP); Shinji Fujikawa, Hiroshima (JP); Hiroshi Naitou, Osaka (JP); Tsuyoshi Nishio, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 241 days.

(21) Appl. No.: 15/571,832

(22) PCT Filed: Mar. 16, 2016

(86) PCT No.: PCT/JP2016/001500
§ 371 (c)(1),
(2) Date: Nov. 5, 2017

(87) PCT Pub. No.: WO2016/185650
PCT Pub. Date: Nov. 24, 2016

(65) Prior Publication Data
US 2018/0327016 A1    Nov. 15, 2018

(30) Foreign Application Priority Data

May 21, 2015    (JP) .................................. 2015-103419

(51) Int. Cl.
*B62D 1/04*    (2006.01)
*B62D 1/06*    (2006.01)
*G01V 3/08*    (2006.01)
*B62D 51/00*    (2006.01)

(52) U.S. Cl.
CPC ............. *B62D 1/046* (2013.01); *B62D 1/065* (2013.01); *B62D 51/002* (2013.01); *G01V 3/08* (2013.01)

(58) Field of Classification Search
CPC .... B60N 2/5685; B60N 2/002; B60N 2/5678; B62D 1/046; B62D 1/065; B62D 51/002;
(Continued)

(56) References Cited

U.S. PATENT DOCUMENTS

| | | | |
|---|---|---|---|
| 2002/0170900 A1 | 11/2002 | Braeuchle et al. | |
| 2013/0098890 A1* | 4/2013 | Virnich | B60N 2/5685 219/204 |
| 2016/0096543 A1 | 4/2016 | Naitou et al. | |

FOREIGN PATENT DOCUMENTS

| | | |
|---|---|---|
| EP | 2572929 B1 | 3/2014 |
| EP | 3048029 B1 | 7/2019 |

(Continued)

OTHER PUBLICATIONS

International Search Report of PCT application No. PCT/JP2016/001500 dated May 17, 2016.
(Continued)

*Primary Examiner* — Shawntina T Fuqua
(74) *Attorney, Agent, or Firm* — Greenblum & Bernstein, P.L.C.

(57) ABSTRACT

A steering wheel grip detection device includes a positive electrode terminal electrically connected to a positive electrode of a power source and a negative electrode terminal electrically connected to a negative electrode of the power source. The steering wheel grip detection device further includes a thermostat, a heater, and an inductance element that are electrically connected with one another in this order in series wiring from the positive electrode terminal to the negative electrode terminal, as well as a capacitor through which a wiring path from the thermostat to the heater is
(Continued)

electrically connected with the negative electrode terminal. The steering wheel grip detection device has an electrostatic sensor circuit that is electrically connected with a wiring path from the inductance element to the heater and that detects a grip on a steering wheel by a capacitance value of the heater.

6 Claims, 17 Drawing Sheets

(58) Field of Classification Search
CPC . B60R 1/01532; B60R 1/0154; B60R 1/0153; B60R 1/01512; G01V 3/08
See application file for complete search history.

(56) References Cited

FOREIGN PATENT DOCUMENTS

| | | |
|---|---|---|
| JP | 2002-340712 | 11/2002 |
| JP | 2010-023649 | 2/2010 |
| JP | 2010-215140 | 9/2010 |
| WO | 2015/040864 | 3/2015 |

OTHER PUBLICATIONS

German Office Action dated Mar. 16 2020 for the related German Patent Application No. 112016002301.4, along with English translation.

\* cited by examiner

STEERING WHEEL GRIP DETECTION DEVICE

This application is a U.S. national stage application of the PCT International Application No. PCT/JP2016/001500 filed on Mar. 16, 2016, which claims the benefit of foreign priority of Japanese patent application No. 2015-103419 filed on, May 21, 2015, the contents all of which are incorporated herein by reference.

TECHNICAL FIELD

The present invention relates to a steering wheel grip detection device that detects a hand grip on a steering wheel by a change in the capacitance value of a heater inside the steering wheel.

BACKGROUND ART

A conventional device for detecting contact between a hand and a steering wheel is proposed in PTL 1, for example. FIG. 17 shows a block circuit diagram of the detection device.

In FIG. 17, first oscillator 103 that includes first capacitor (capacity) 101 generates a first signal having frequency f1. First capacitor 101 is provided in a steering wheel (not shown) of a vehicle (not shown). First capacitor 101 may be a part of a heater existing in the steering wheel, for example.

Second oscillator 109 that includes second capacitor (capacity) 105 and third adjustable capacitor (capacity) 107 generates a second signal having second frequency f2. While no hand of a driver is put over the steering wheel, first and second frequencies f1 and f2 are equal to each other. Mixer 111 returns an absolute value of a difference between first and second frequencies f1 and f2. Frequency-voltage converter 113 converts the absolute value of the difference into output voltage U.

If a hand of the driver comes close to the steering wheel and ultimately takes hold of the steering wheel, first capacitor 101 comes under the influence of this action, and as a result, first frequency f1 changes. Voltage U continuously rises with a decrease in distance from the hand to the steering wheel. As soon as voltage U exceeds first threshold S1, the detection device detects contact between the hand and the steering wheel.

CITATION LIST

Patent Literature

PTL 1: Unexamined Japanese Patent Publication No. 2002-340712

SUMMARY OF THE INVENTION

It is an object of the present invention to provide a steering wheel grip detection device designed to double as a steering wheel heater and reduce the influence of opening or closing of a thermostat on grip detection.

A steering wheel grip detection device according to the present invention includes a series circuit made up of a heater and an inductance element, as well as a lead electrically connected to a connection point on the series circuit. The steering wheel grip detection device has a thermostat that is connected in series with the series circuit and a capacitive element that is electrically connected in parallel with any one of the series circuit and the thermostat. The steering wheel grip detection device further includes an electrostatic sensor circuit electrically connected to the lead. The electrostatic sensor circuit detects a grip on a steering wheel by a capacitance value of the heater.

A steering wheel grip detection device according to the present invention includes a heater and a lead that is electrically connected to an intermediate point on a wiring path forming the heater. The steering wheel grip detection device has a thermostat that is connected in series with the heater and a capacitive element that is electrically connected in parallel with any one of the heater and the thermostat. The steering wheel grip detection device further includes an electrostatic sensor circuit electrically connected to the lead. The electrostatic sensor circuit detects a grip on a steering wheel by a capacitance value of the heater.

The steering wheel grip detection device according to the present invention produces the effect of reducing the influence of opening or closing of the thermostat on output signals of the electrostatic sensor circuit.

DESCRIPTION OF EMBODIMENTS

Prior to describing exemplary embodiments of the present invention, problems with the aforementioned detection device will be briefly described. The detection device described above detects contact between a hand of a driver and a steering wheel when the driver holds the steering wheel with the hand. The detection device detects contact between a hand and the steering wheel by the use of a heater inside the steering wheel and has a thermostat on a wiring path for the heater in order to prevent the heater from excessively heating and regulate the heater temperature. In the case of this general configuration, first capacitor 101 is influenced by not only the approach of a hand but also opening or closing of the thermostat. Because of autonomous action of the thermostat, the detection device cannot directly recognize the opening or closing of the thermostat. As a result, influence on first capacitor 101 abruptly changes in response to the opening or closing of the thermostat. This can disadvantageously cause an error in hand contact (grip) detection.

Hereinafter, exemplary embodiments of the present invention will be described with reference to the drawings.

First Exemplary Embodiment

Figure 1:
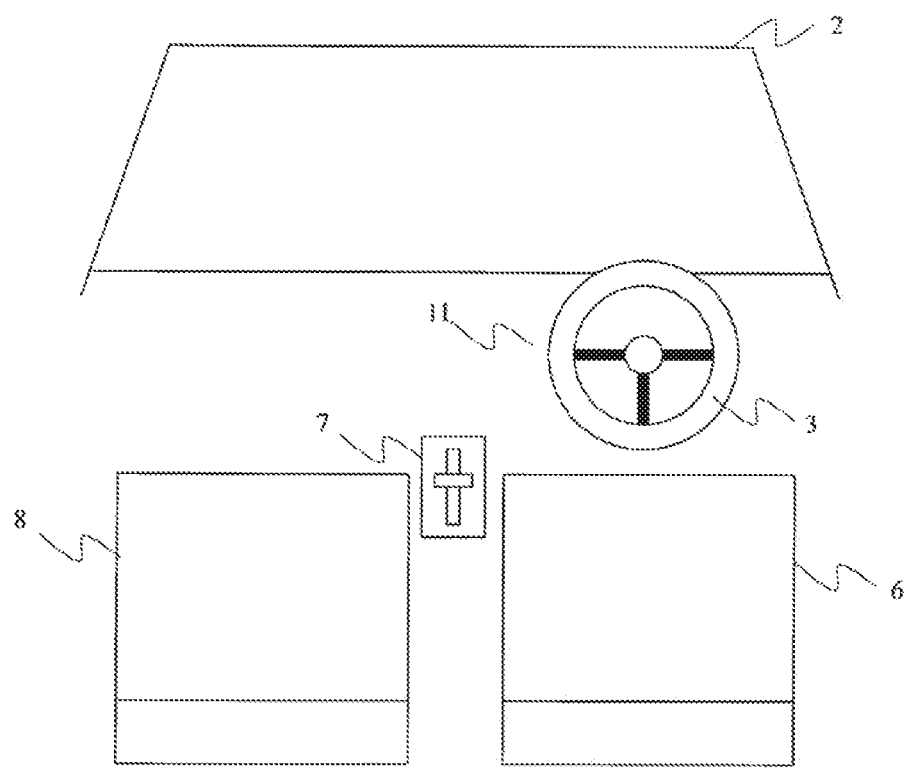
FIG. 1 is a schematic view illustrating a vehicle cabin including a steering wheel grip detection device according to a first exemplary embodiment of the present invention.
Figure 2:
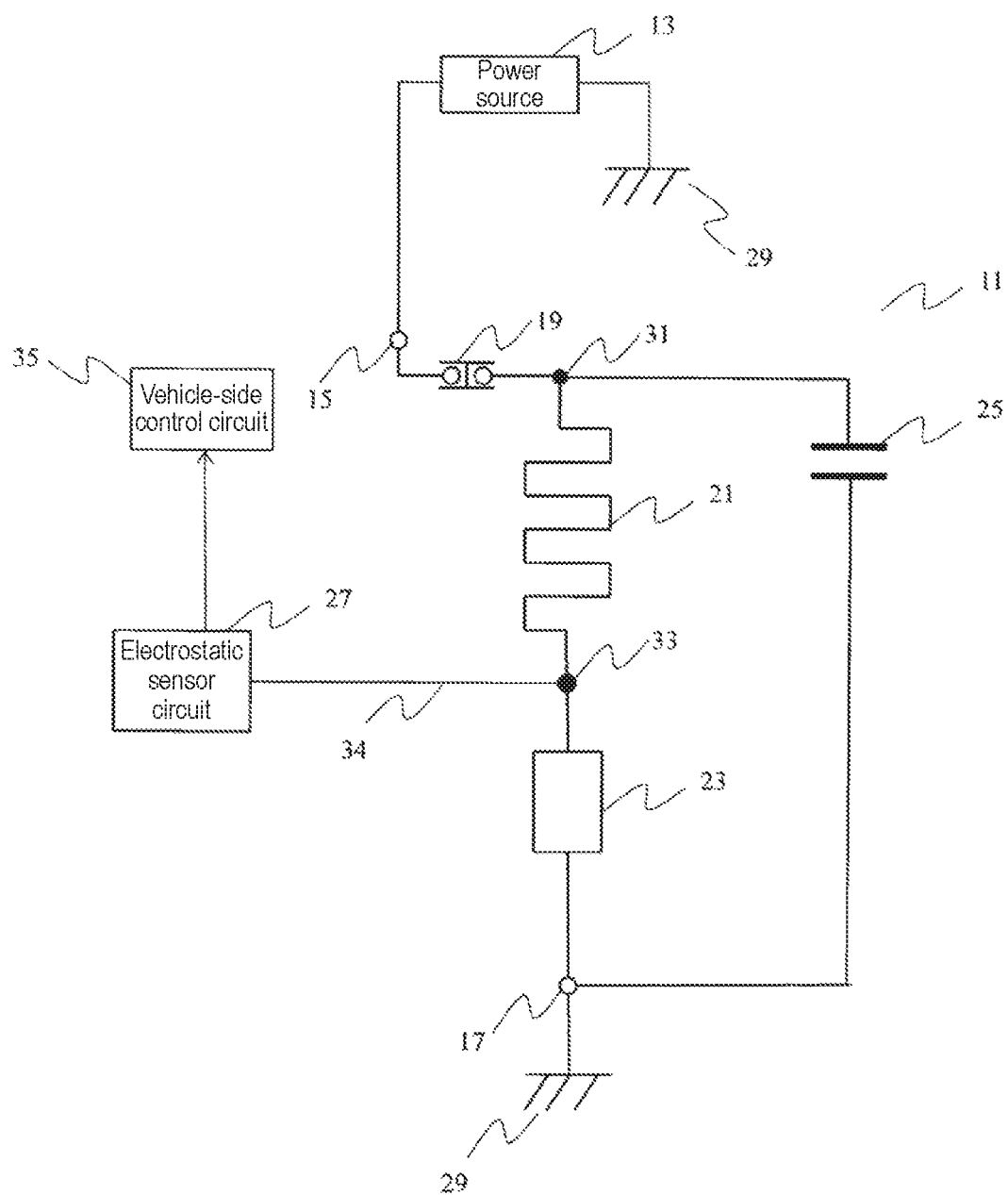
FIG. 2 is a block circuit diagram of the steering wheel grip detection device according to the first exemplary embodiment of the present invention.
Figure 3A:
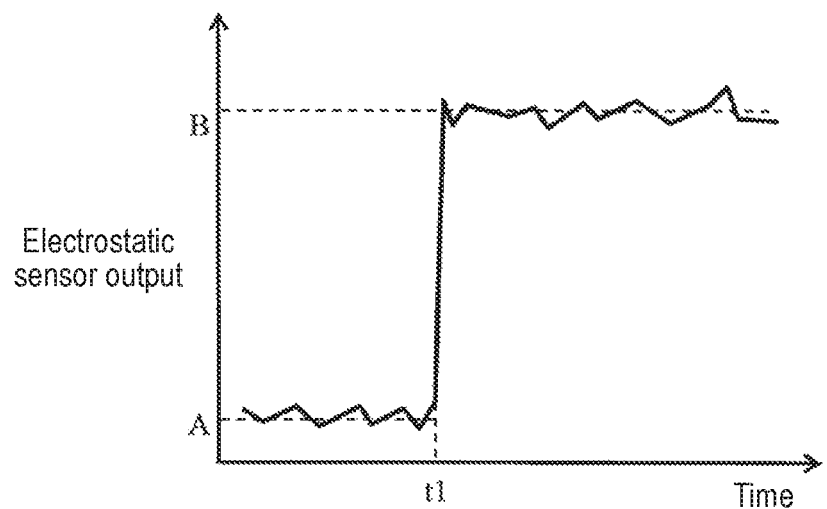
FIG. 3A illustrates a profile of electrostatic sensor output over time of the steering wheel grip detection device having no connected capacitor according to the first exemplary embodiment of the present invention.
Figure 3B:
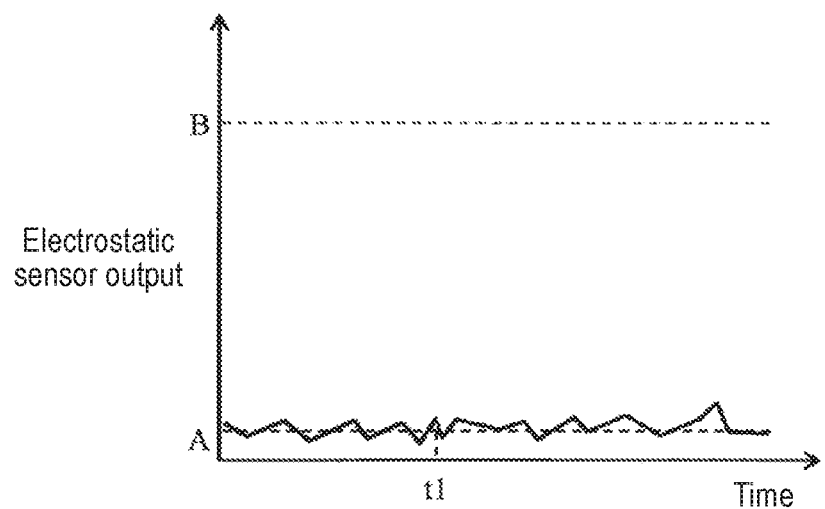
FIG. 3B illustrates a profile of electrostatic sensor output over time of the steering wheel grip detection device having a connected capacitor according to the first exemplary embodiment of the present invention.
Figure 4:
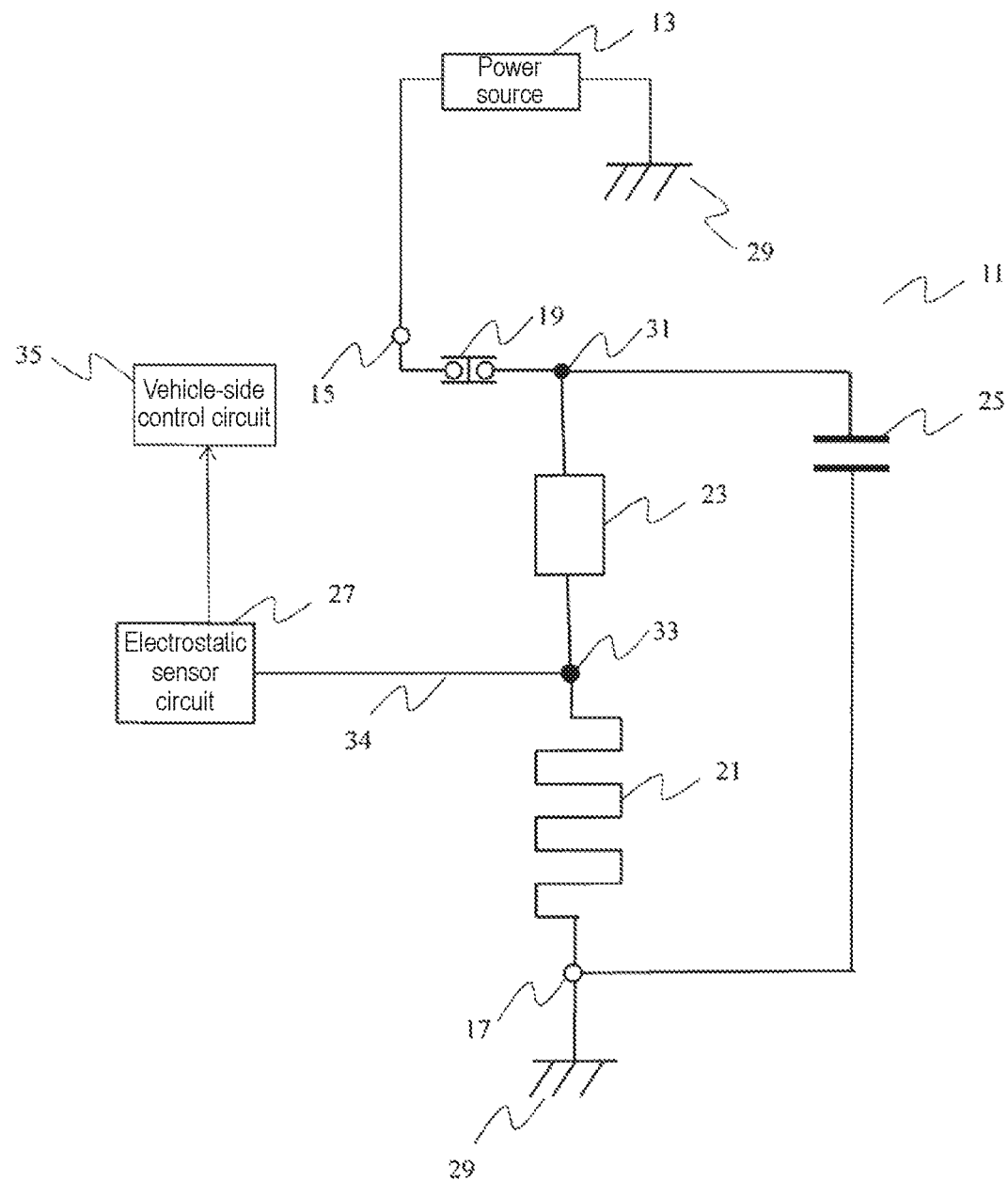
FIG. 4 is another block circuit diagram of the steering wheel grip detection device according to the first exemplary embodiment of the present invention.
Figure 5:
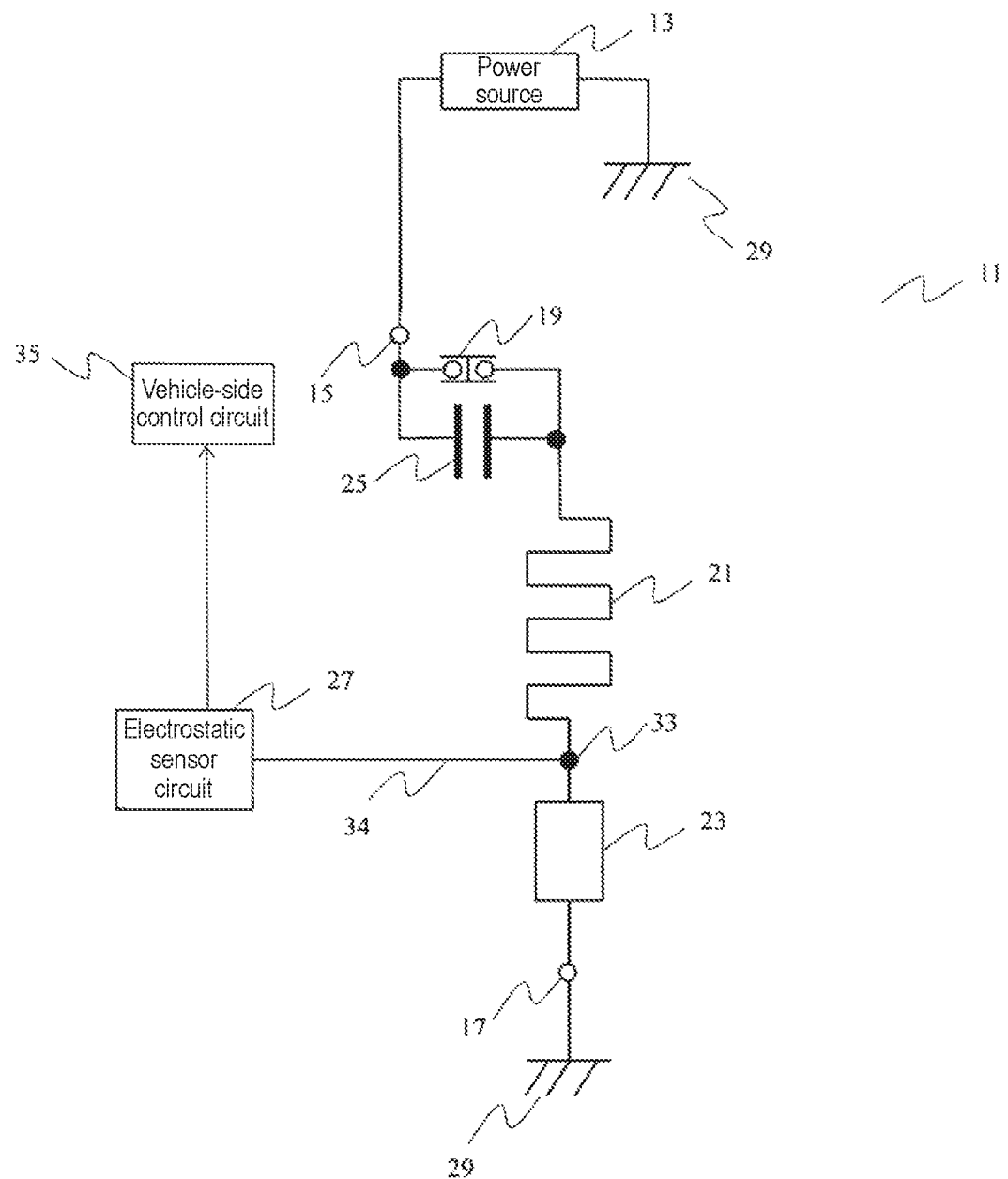
FIG. 5 is another block circuit diagram of the steering wheel grip detection device according to the first exemplary embodiment of the present invention.
Figure 6:
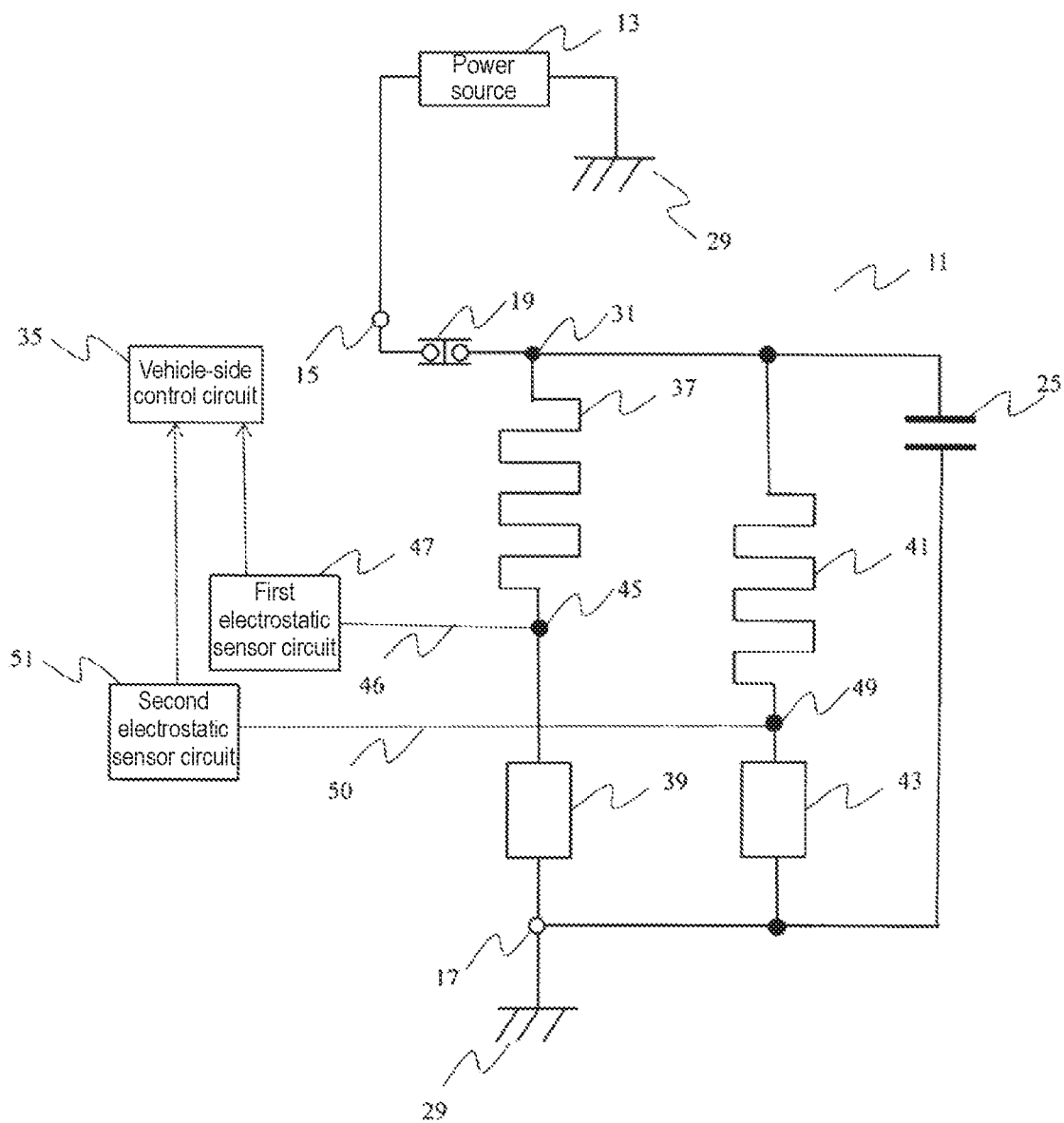
FIG. 6 is another block circuit diagram of the steering wheel grip detection device according to the first exemplary embodiment of the present invention.
Figure 7:
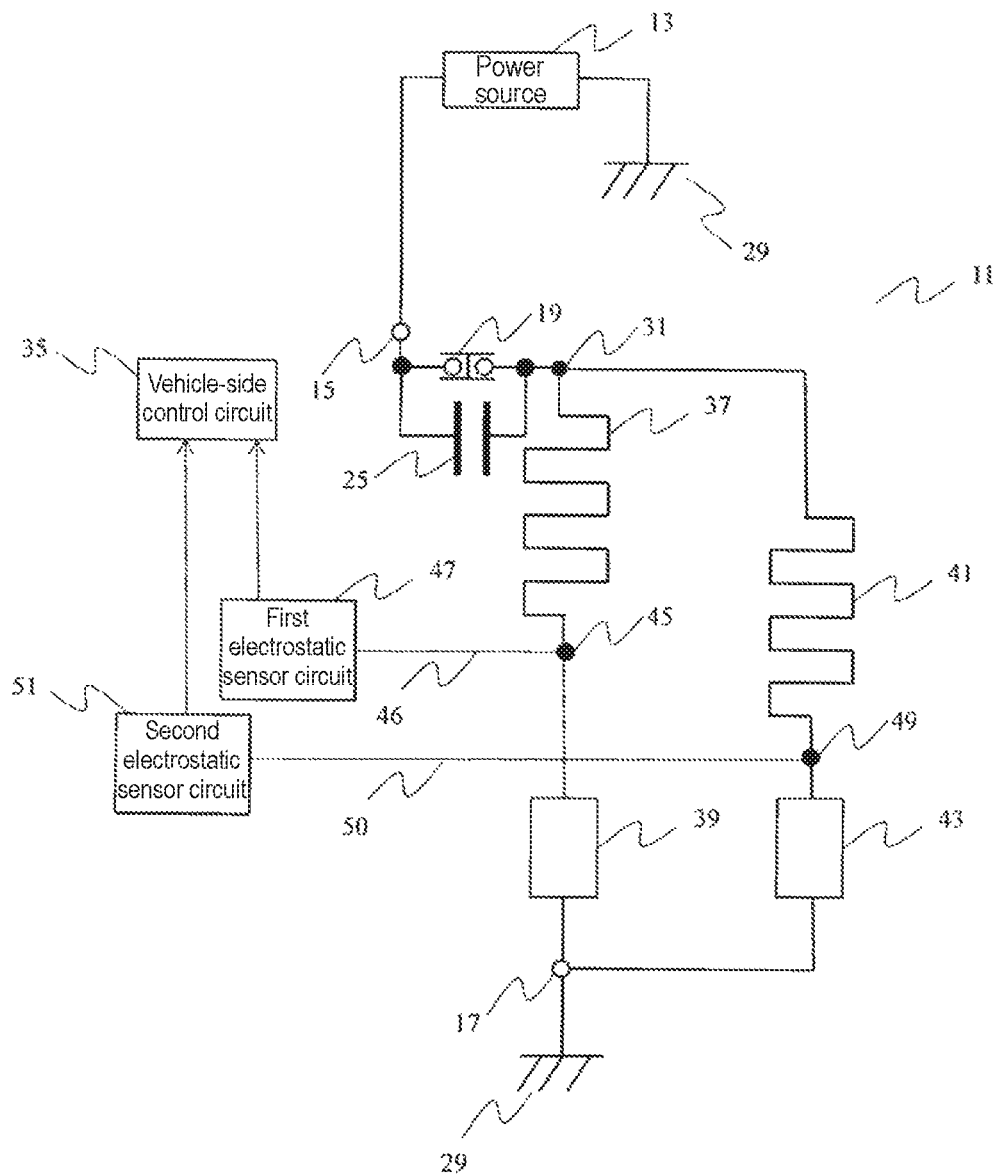
FIG. 7 is another block circuit diagram of the steering wheel grip detection device according to the first exemplary embodiment of the present invention.

FIG. 1 is a schematic view illustrating a vehicle cabin including a steering wheel grip detection device according to a first exemplary embodiment of the present invention. FIG. 2 is a block circuit diagram of the steering wheel grip detection device according to the first exemplary embodiment of the present invention. FIGS. 3A and 3B each illustrate a profile of electrostatic sensor output over time of the steering wheel grip detection device according to the first exemplary embodiment of the present invention. FIG. 3A shows that for the device having no connected capacitor, whereas FIG. 3B shows that for the device having a connected capacitor. FIG. 4 is another block circuit diagram of the steering wheel grip detection device according to the first exemplary embodiment of the present invention. FIG. 5 is another block circuit diagram of the steering wheel grip detection device according to the first exemplary embodiment of the present invention. FIG. 6 is another block circuit diagram of the steering wheel grip detection device according to the first exemplary embodiment of the present invention. FIG. 7 is another block circuit diagram of the steering wheel grip detection device according to the first exemplary embodiment of the present invention.

With reference to FIG. 2, steering wheel grip detection device 11 includes a series circuit made up of heater 21 and inductance element 23, as well as lead 34 electrically connected to connection point 33 on the series circuit. The detection device has thermostat 19 that is connected in series with the series circuit and capacitive element 25 that is electrically connected in parallel with any one of the series circuit and thermostat 19. The detection device further includes electrostatic sensor circuit 27 that is electrically connected to lead 34 and detects a grip on a steering wheel by a capacitance value of heater 21.

This configuration can reduce the influence of opening or closing of thermostat 19 on output signals of electrostatic sensor circuit 27 (electrostatic sensor output).

The first exemplary embodiment will now be described more specifically in terms of configuration and operation.

FIG. 1 is a schematic view illustrating a vehicle cabin including steering wheel grip detection device 11. Steering wheel 3 is disposed near windshield 2. Driver's seat 6 is disposed near steering wheel 3. Passenger seat 8 is disposed next to driver's seat 6 via shift lever 7.

In FIG. 1, steering wheel grip detection device 11 is built into a rim of steering wheel 3. This configuration enables steering wheel grip detection device 11 to detect whether or not a hand is holding the rim of steering wheel 3 and output a detection outcome. Steering wheel grip detection device 11 will now be described in detail.

In FIG. 2, power source 13 is designed to run heater 21 described later. A positive electrode of power source 13 is electrically connected to positive electrode terminal 15 on steering wheel grip detection device 11.

One end of thermostat 19 is electrically connected to positive electrode terminal 15. Thermostat 19 exercises control so as to prevent heater 21 from excessively heating. Specifically, thermostat 19 is disposed near heater 21 such that temperature of heater 21 is readily conveyed.

Thus, one end of heater 21 is electrically connected to the other end of thermostat 19. The type of heater 21 is not particularly limited. In the first exemplary embodiment, heater 21 is a heater wire sewn on a nonwoven fabric. Consequently, heater 21 is built into steering wheel 3.

One end of inductance element 23 is electrically connected to the other end of heater 21. Examples of inductance element 23 include inductors and semiconductor switching elements. In the first exemplary embodiment, inductance element 23 is an inductor.

The other end of inductance element 23 is electrically connected to negative electrode terminal 17. Steering wheel grip detection device 11 is electrically connected to a negative electrode (ground 29) of power source 13 via negative electrode terminal 17. Since the first exemplary embodiment is provided with inductance element 23, signals for detection of a hand grip, i.e. alternating current signals, do not directly reach ground 29.

First connection point 31 interposed between thermostat 19 and heater 21 is electrically connected to negative electrode terminal 17 via capacitor 25, a capacitive element. A function of capacitor 25 is described later. In the first exemplary embodiment, capacitor 25 is a commercially available discrete electronic component. However, capacitor 25 may be an on-board capacitor, for example, other than the discrete electronic component. In this specification, these various capacitors are collectively called capacitive elements.

Second connection point 33 interposed between heater 21 and inductance element 23 is electrically connected to electrostatic sensor circuit 27 via lead 34. Electrostatic sensor circuit 27 is configured to detect a change in capacitance value owing to contact of a hand of a driver with steering wheel 3 having heater 21 built-in and send a signal of detection to vehicle-side control circuit 35. Electrostatic sensor circuit 27 sends alternating current to heater 21 to detect this change.

Vehicle-side control circuit 35 comprehensively controls a vehicle. Vehicle-side control circuit 35 not only determines the contact of the driver's hand with steering wheel 3 in response to the signal sent from electrostatic sensor circuit 27 but also controls heater 21 and other various electrical parts. In FIG. 2, illustration of these parts is omitted. This configuration enables vehicle-side control circuit 35 to control the vehicle in response to the status of a grip of the hand on steering wheel 3. The signal sent from electrostatic sensor circuit 27 may enter a control circuit around the steering wheel, for example, or any control circuit other than vehicle-side control circuit 35.

In the configuration as shown in FIG. 2, steering wheel grip detection device 11 includes components other than power source 13 and vehicle-side control circuit 35 by definition. With reference to FIG. 1, steering wheel grip detection device 11 is built into steering wheel 3. However, the configuration of these elements is not limited to this example. Specifically, at least heater 21 and thermostat 19 may be built into steering wheel 3, for example, and all or some of the other components of the detection device may be provided outside steering wheel 3.

With reference to FIGS. 3A and 3B, the operation of steering wheel grip detection device 11 will now be described. In each of FIGS. 3A and 3B the horizontal axis shows time, and the vertical axis shows electrostatic sensor output described above.

First, a conventional device without capacitor 25 of FIG. 2 is described in detail. The device without capacitor 25 has a capacitance value as shown below with electrostatic sensor circuit 27 used as a reference. While thermostat 19 is opened, nothing is connected to first connection point 31 for heater 21 and thus the heater is electrically interrupted. As a result, the capacitance value of the device with electrostatic sensor circuit 27 used as a reference depends solely on the capacitance value of inductance element 23. While thermostat 19 is closed, power source 13 is essentially connected to ground 29 from the perspective of alternating current conduction. As a result, the capacitance value of the device with electrostatic sensor circuit 27 used as a reference depends on a combination of the capacitance values of heater 21 and inductance element 23. Consequently, as shown in FIG. 3A, when thermostat 19 that has been opened until time t1 closes at time t1, the combined capacitance value, which has been only the capacitance value of inductance element 23, starts to include the capacitance value of heater 21, for example. Accordingly, the electrostatic sensor output rapidly rises from value A to value B. This change can cause a non-negligible error in the capacitance value change resulting from contact of a hand. In FIGS. 3A and 3B, the electrostatic sensor output fluctuates with respect to each mean value (dashed-line value) in a short cycle owing to noise. In the case of FIG. 3A, when thermostat 19 alters from the open to the close state, the electrostatic sensor output rapidly rises. The electrostatic sensor output, however, can behave inversely, i.e. rapidly drop, depending on the overall configuration including heater 21. The description herein illustrates the case of a rapid rise.

Next, with reference to FIG. 3B, the behavior of a device that includes connected capacitor 25 as shown in FIG. 2 is described. The behavior of the device with thermostat 19 closed will now be described. Electrostatic sensor circuit 27 sends alternating current to heater 21 to detect and determine a change in the capacitance value of heater 21. Thus, capacitor 25 is essentially brought into conduction with electrostatic sensor circuit 27 used as a reference. Since capacitor 25 is essentially conductive during the closing of thermostat 19, the device has a capacitance value that is only a combination of the capacitance value of heater 21 and the capacitance value of inductance element 23 with electrostatic sensor circuit 27 used as a reference.

While thermostat 19 is opened, first connection point 31 is electrically connected to ground 29 via capacitor 25. Thus, the device has a capacitance value that is only a combination of the capacitance value of heater 21 and the capacitance value of inductance element 23 with electrostatic sensor circuit 27 used as a reference. Consequently, with reference to FIG. 3B, even if thermostat 19 that has been opened until time t1 closes at time t1, for example, the electrostatic sensor output stays at value A because of the opening or closing of thermostat 19 scarcely influencing combined impedance. This configuration can reduce the influence of an error arising from the opening or closing of thermostat 19 on a change made in the capacitance value of heater 21 due to contact of a hand.

Steering wheel grip detection device 11 implementing the configuration and operation described above can reduce the influence of opening or closing of thermostat 19 on output signals of electrostatic sensor circuit 27 (electrostatic sensor output).

In the first exemplary embodiment, thermostat 19, heater 21, and inductance element 23 are electrically connected with one another in this order in series wiring from positive electrode terminal 15 to negative electrode terminal 17. In this series connection, the places of inductance element 23 and heater 21 may be interchanged. FIG. 4 shows a configuration like this. In steering wheel grip detection device 11 of FIG. 4, thermostat 19, inductance element 23, and heater 21 are electrically connected with one another in this order in series wiring from positive electrode terminal 15 to negative electrode terminal 17. The rest of the configuration is identical to that in FIG. 2. This configuration has the identical disposition of thermostat 19 and capacitor 25 on the circuit and thus can reduce the influence of thermostat 19 on electrostatic sensor output owing to the same logic described with FIGS. 3A and 3B.

In the first exemplary embodiment, a wiring path (first connection point 31 in FIG. 2) from thermostat 19 to heater 21 is electrically connected with negative electrode terminal 17 via capacitor 25. However, capacitor 25 may be electrically connected in parallel with thermostat 19. FIG. 5 shows a device in this instance. In FIG. 5, the device has a configuration similar to that in FIG. 2 except for the point described above. Thus, detailed description of the configuration is omitted. Operation of the device is described herein.

In FIG. 5, while thermostat 19 is opened, capacitor 25 is essentially conductive from the perspective of alternating current conduction. Thus, the device has a capacitance value that is a combination of the capacitance values of heater 21 and inductance element 23 with electrostatic sensor circuit 27 used as a reference. While thermostat 19 is closed, both ends of capacitor 25 are short-circuited. Thus, as in the case of opened thermostat 19, the device has a capacitance value that is a combination of the capacitance values of heater 21 and inductance element 23 with electrostatic sensor circuit 27 used as a reference. Consequently, the combined capacitance value with electrostatic sensor circuit 27 used as a reference remains the almost same regardless of whether thermostat 19 is opened or closed. This configuration reduces the influence of thermostat 19 on electrostatic sensor output.

In like manner with the configuration of FIG. 5, capacitor 25 in the configuration of FIG. 4 may be connected in parallel with thermostat 19 although no illustration is given. A device in this instance as well can produce effects identical to those with FIGS. 4 and 5 described above.

In the first exemplary embodiment, the device includes a single group of heater 21 and inductance element 23. The device may include a plurality of groups of these elements. In other words, the device includes a plurality of parallel-connected series circuits (each made up of a heater and an inductance element), as well as a plurality of electrostatic sensor circuits that are electrically connected to the respective series circuits. FIG. 6 shows a configuration in this instance.

In FIG. 6, two groups of heaters and inductance elements are connected in parallel with each other. In FIG. 6, the components in the left-hand group are called first heater 37 and first inductance element 39. Similarly, the components in the right-hand group are called second heater 41 and second inductance element 43. Since this device includes two groups of the heaters and the inductance elements, the device needs two electrostatic sensor circuits to detect a hand grip over the respective heaters. Thus, a connection point (third connection point 45) between first heater 37 and first inductance element 39 in the left-hand group of FIG. 6 is electrically connected to first electrostatic sensor circuit 47 via first lead 46. Similarly, a connection point (fourth connection point 49) between second heater 41 and second inductance element 43 in the right-hand group of FIG. 6 is electrically connected to second electrostatic sensor circuit 51 via second lead 50. Signals individually sent from first and second electrostatic sensor circuits 47 and 51 enter vehicle-side control circuit 35.

Owing to the same logic described with FIG. 2, this configuration can reduce the influence of opening or closing of thermostat 19 on electrostatic sensor output. This in turn reduces the influence of thermostat 19 on output signals of first and second electrostatic sensor circuits 47 and 51. Due to electrical connection of two groups of the heaters and the inductance elements, this device has capacitance values that are a combination of the capacitance values of first heater 37 and first inductance element 39, as well as a combination of the capacitance values of second heater 41 and second inductance element 43 with first and second electrostatic sensor circuits 47 and 51 used as respective references.

This configuration provides two separate heaters. Thus, the device can determine which one of a right hand, a left hand and both hands is touching the steering wheel.

In FIG. 6, the device includes two groups of the heaters and the inductance elements. The device may include three or more groups of these elements. In this case, the device includes a parallel connection of series circuits that are each made up of a heater and an inductance element, as shown in FIG. 6. This configuration provides fragmented grip detection sections on steering wheel 3 and thus improves accuracy in hand position detection.

In the configuration of FIG. 6, the places of the heater and the inductance element in each circuit may be interchanged in like manner with the configuration of FIG. 4. A device in this instance as well can reduce the influence of thermostat 19 on electrostatic sensor output as described with FIG. 4. In FIG. 6, only the places of second heater 41 and second inductance element 43 in the right-hand group may be interchanged, for example. A configuration like this is applicable if a plurality of inductance elements are disposed into confined space in steering wheel 3 and an interchange of the places of some of the elements is desirable for the sake of disposition, for example.

In the configuration of FIG. 6, capacitor 25 may be electrically connected in parallel with thermostat 19 in like manner with the configuration of FIG. 5. FIG. 7 shows a configuration like this. The configuration having a large number of groups that are each made up of a heater and an inductance element, as well can reduce the influence of opening or closing of thermostat 19 on electrostatic sensor output owing to the same logic described with FIG. 5. This device, however, has a capacitance value that is a combination of the capacitance values of two heaters and two inductance elements as described with FIG. 6. In the configuration of FIG. 7, capacitor 25 is connected in parallel with thermostat 19, and thus the two components can be disposed near to each other in the circuit. This configuration is beneficial for disposition of components into the confined space in steering wheel 3.

In the configuration of FIG. 7, the places of the heater and the inductance element in each circuit may be interchanged as shown in FIG. 4 although no illustration is given. A device in this instance as well can reduce the influence of thermostat 19 on electrostatic sensor output as described with FIG. 4.

Second Exemplary Embodiment

Figure 8:
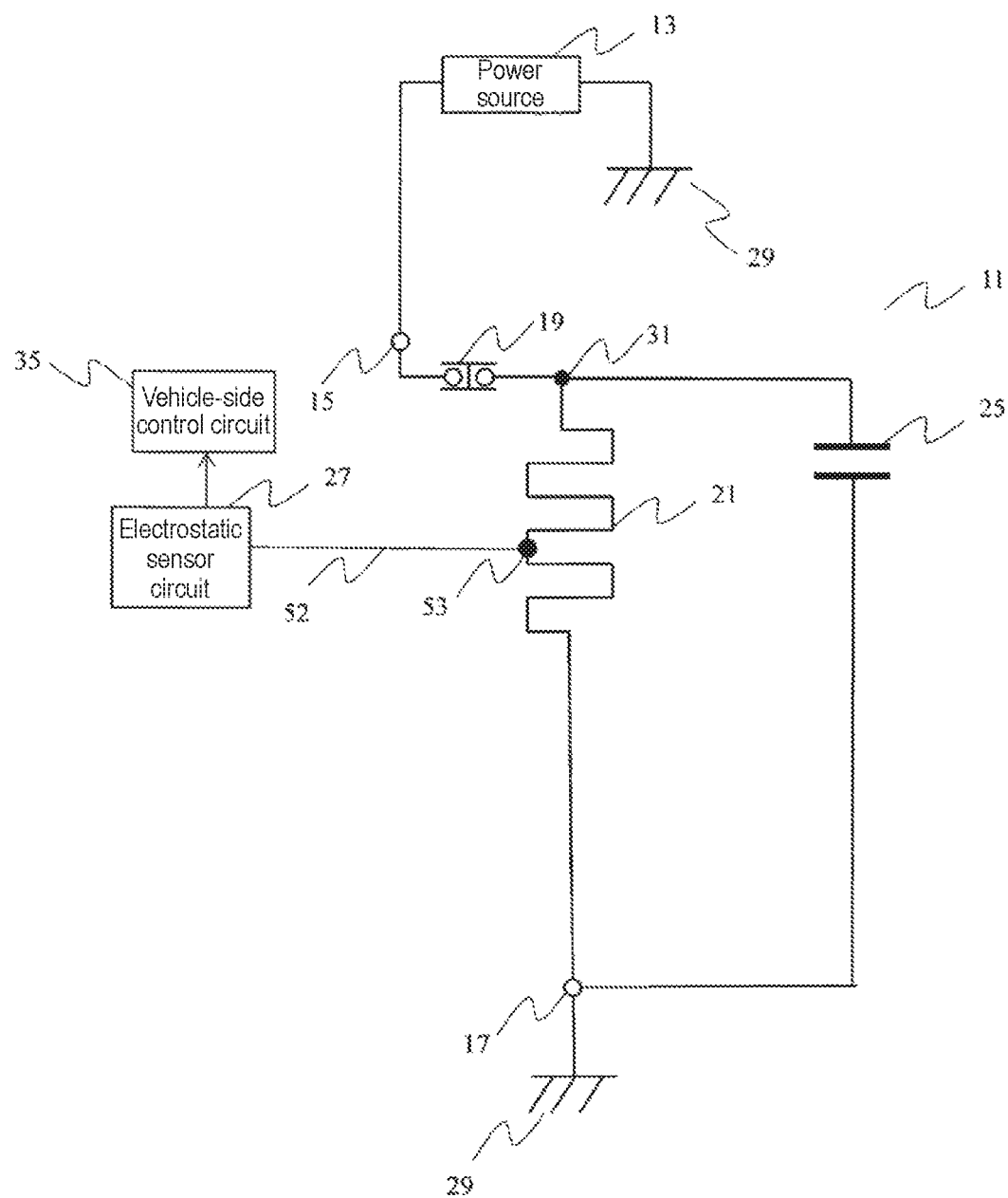
FIG. 8 is a block circuit diagram of a steering wheel grip detection device according to a second exemplary embodiment of the present invention.
Figure 9:
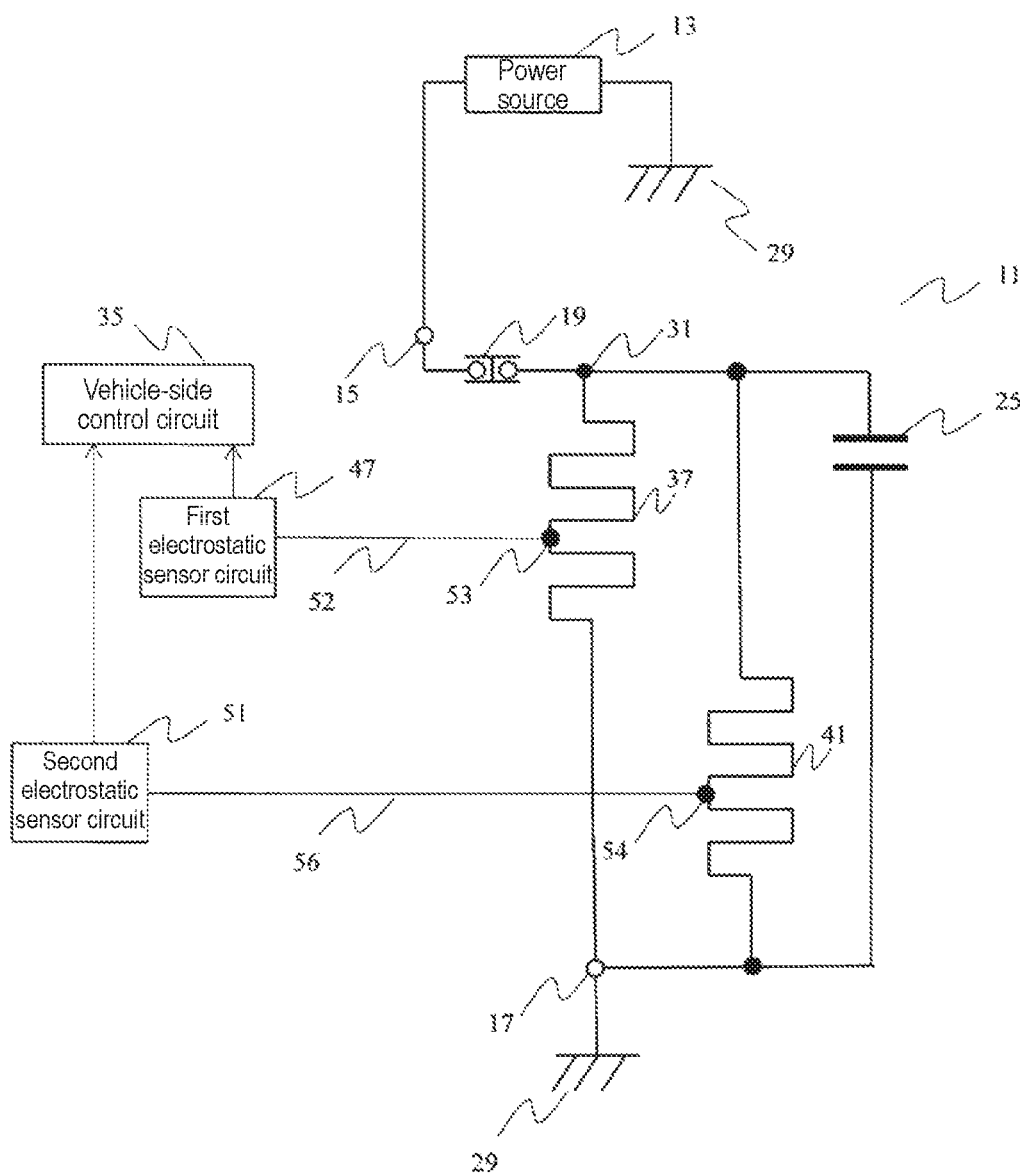
FIG. 9 is another block circuit diagram of the steering wheel grip detection device according to the second exemplary embodiment of the present invention.

FIG. 8 is a block circuit diagram of a steering wheel grip detection device according to a second exemplary embodiment of the present invention. FIG. 9 is another block circuit diagram of the steering wheel grip detection device according to the second exemplary embodiment of the present invention. In the second exemplary embodiment, components identical to components of the first exemplary embodiment are denoted by the same numerals or symbols, and detailed descriptions thereof are omitted.

With reference to FIG. 8, steering wheel grip detection device 11 includes heater 21 and lead 52 that is electrically connected to an intermediate point on a wiring path forming heater 21. The detection device has thermostat 19 that is connected in series with heater 21 and capacitive element 25 that is electrically connected in parallel with any one of heater 21 and thermostat 19. The detection device further includes electrostatic sensor circuit 27 that is electrically connected to lead 52 and detects a grip on a steering wheel by a capacitance value of heater 21.

This device has a circuit disposition of thermostat 19 and capacitor 25 similarly to that in the first exemplary embodiment and thus can reduce the influence of opening or closing of thermostat 19 on electrostatic sensor output although this configuration omits inductance element 23 by connecting electrostatic sensor circuit 27 to the intermediate point on the wiring path forming heater 21.

The second exemplary embodiment will now be described in detail. The following description is primarily given on discrepancies between the first and second exemplary embodiments.

In FIG. 8, the device includes heater 21 and negative electrode terminal 17 that are directly connected to each other without inductance element 23. This means that the device has no second connection point 33, i.e. no connection destination for electrostatic sensor circuit 27. Consequently, in the second exemplary embodiment, electrostatic sensor circuit 27 is connected to an intermediate (midway) point on the wiring path, which forms heater 21, via lead 52. This connection point is hereafter referred to as fifth connection point 53. This configuration means, from the perspective of alternating current conduction, that an upper half and a lower half of heater 21 in FIG. 8 are essentially connected with respective inductance elements. Thus, this configuration can detect a hand grip on steering wheel 3 by a change in the capacitance value of heater 21.

The lower half of heater 21 in the configuration of FIG. 8 corresponds to inductance element 23 in the first exemplary embodiment. Thus, this device reduces the influence of opening or closing of thermostat 19 on electrostatic sensor output on a par with the device of the first exemplary embodiment.

Fifth connection point 53 may be disposed anywhere on heater 21 other than both ends of heater 21. However, if fifth connection point 53 is close to either end of heater 21, the end comes close to a conductive state from the perspective of alternating current conduction. If fifth connection point 53 is close to first connection point 31, alternating current signals sent from electrostatic sensor circuit 27 for measurement reach ground 29 by way of power source 13 at the time of thermostat 19 being closed. If fifth connection point 53 is near negative electrode terminal 17, alternating current signals for measurement directly reach ground 29. Thus, the configuration in either case lessens the possibility of properly detecting a hand grip on steering wheel 3. Consequently, it is preferred that fifth connection point 53 be disposed near the middle of heater 21.

The second exemplary embodiment eliminates the need for inductance element 23. This leads to a decrease in footprint and makes the device beneficial for disposition of steering wheel grip detection device 11 into confined space in steering wheel 3.

Steering wheel grip detection device 11 implementing the configuration and operation described above can reduce the influence of opening or closing of thermostat 19 on electrostatic sensor output even though electrostatic sensor circuit 27 is connected to an intermediate point on the wiring path of heater 21.

In like manner with the configuration of the first exemplary embodiment shown in FIG. 6, the device in the second exemplary embodiment may include a plurality of parallel-connected heaters and a plurality of electrostatic sensor circuits that are electrically connected to leads for the respective heaters. FIG. 9 shows a configuration like this. The configuration of FIG. 9, compared to the configuration of FIG. 8, includes second heater 41 connected in parallel with both ends of first heater 37 (both ends of heater 21 in FIG. 8), seventh connection point 54 disposed at an intermediate (midway) point on a wiring path of second heater 41, and second electrostatic sensor circuit 51 electrically connected to seventh connection point 54 via lead 56. Heater 21 and electrostatic sensor circuit 27 in FIG. 8 are called first heater 37 and first electrostatic sensor circuit 47 respectively in FIG. 9, following notation in FIG. 6.

This configuration as well can reduce the influence of opening or closing of thermostat 19 and detect a hand grip on a steering wheel owing to the same logic described in the first exemplary embodiment. The plurality of the heaters in FIG. 9 bring the same advantages as described with FIG. 6.

Capacitor 25 in each of the configurations of FIGS. 8 and 9 according to the second exemplary embodiment may be connected in parallel with thermostat 19 as illustrated in FIG. 5 in the first exemplary embodiment. These modified configurations can reduce the influence of thermostat 19 on electrostatic sensor output as described in the first exemplary embodiment.

Third Exemplary Embodiment

Figure 10:
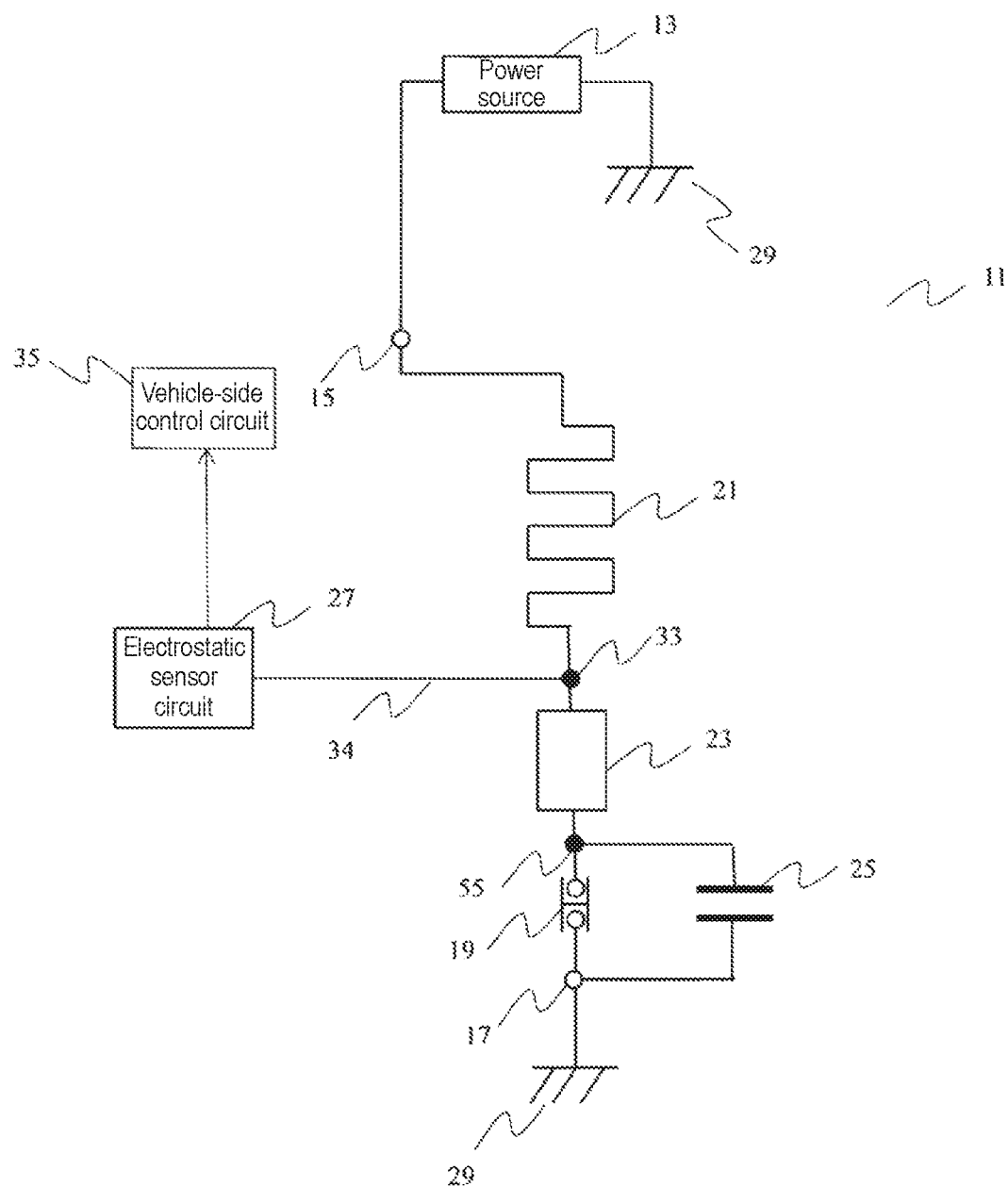
FIG. 10 is a block circuit diagram of a steering wheel grip detection device according to a third exemplary embodiment of the present invention.
Figure 11:
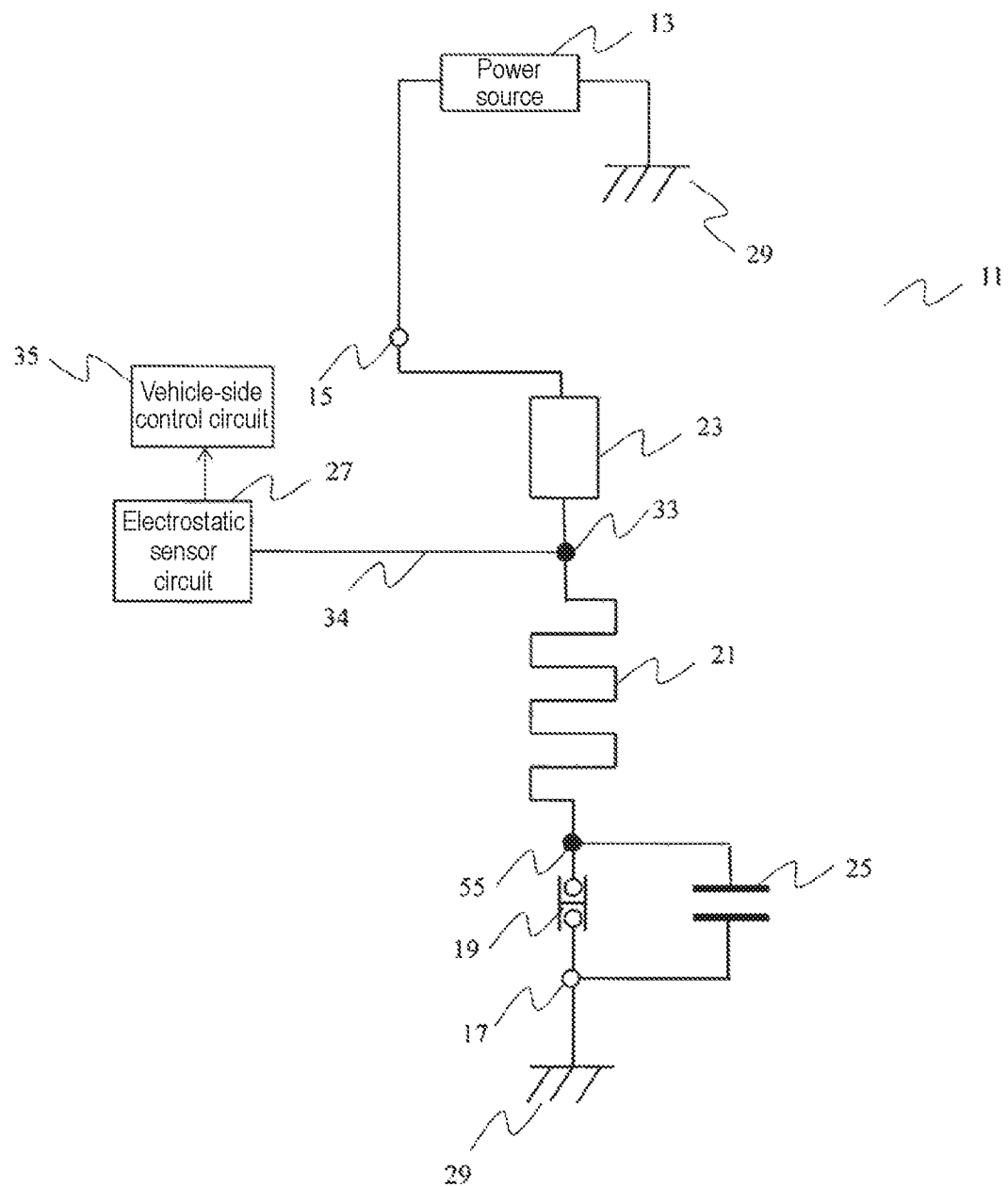
FIG. 11 is another block circuit diagram of the steering wheel grip detection device according to the third exemplary embodiment of the present invention.
Figure 12:
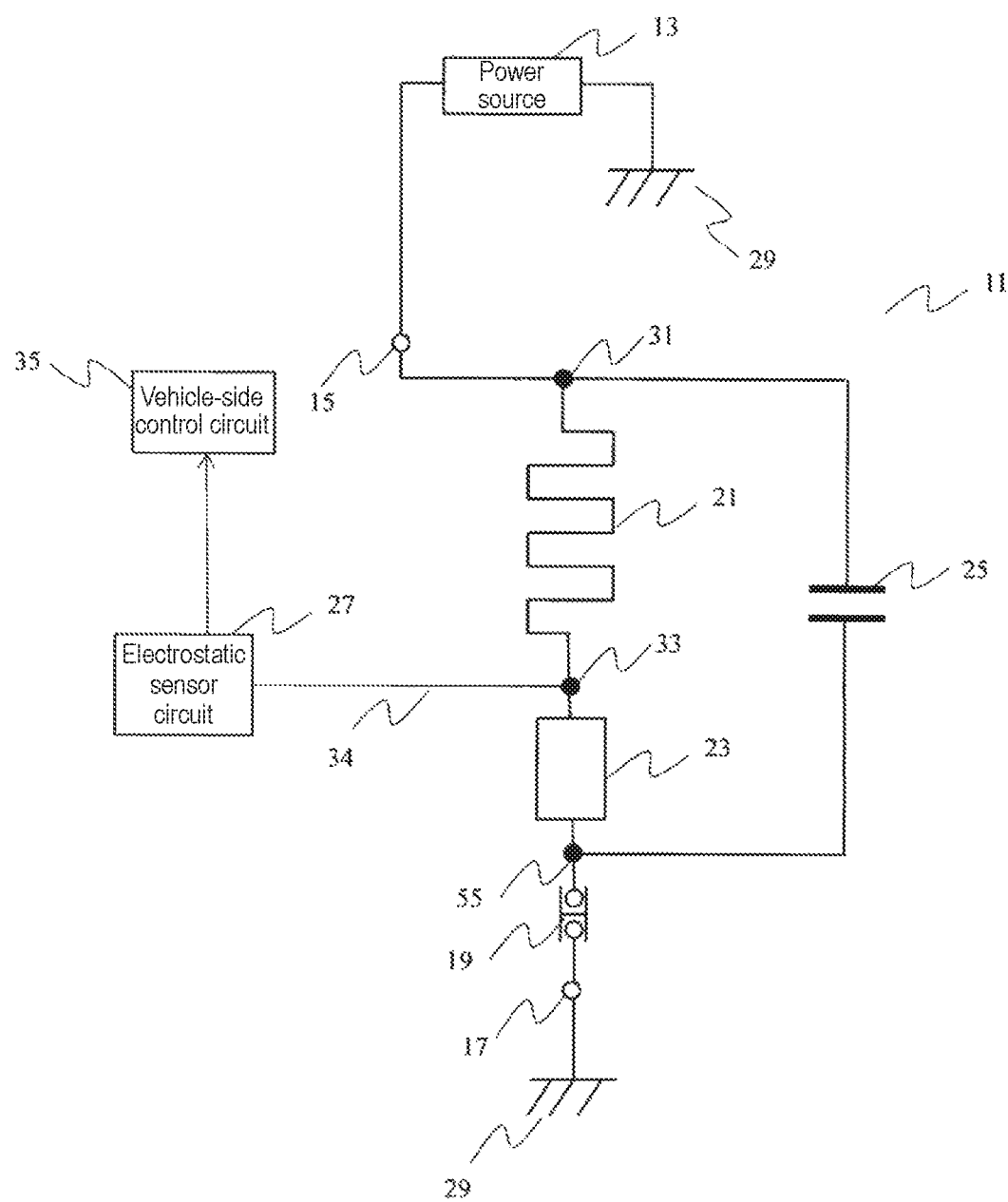
FIG. 12 is another block circuit diagram of the steering wheel grip detection device according to the third exemplary embodiment of the present invention.

FIG. 10 is a block circuit diagram of a steering wheel grip detection device according to a third exemplary embodiment of the present invention. FIG. 11 is another block circuit diagram of the steering wheel grip detection device according to the third exemplary embodiment of the present invention. FIG. 12 is another block circuit diagram of the steering wheel grip detection device according to the third exemplary embodiment of the present invention. In the third exemplary embodiment, components identical to components of the first exemplary embodiment are denoted by the same numerals or symbols, and detailed descriptions thereof are omitted.

With reference to FIG. 10, steering wheel grip detection device 11 includes positive electrode terminal 15 electrically connected to a positive electrode of power source 13 and negative electrode terminal 17 electrically connected to a negative electrode of power source 13. Steering wheel grip detection device 11 further includes heater 21, inductance element 23, and thermostat 19 that are electrically connected with one another in this order in series wiring from positive electrode terminal 15 to negative electrode terminal 17, as well as a capacitive element (capacitor 25) that is electrically connected in parallel with thermostat 19. Steering wheel grip detection device 11 has electrostatic sensor circuit 27 that is electrically connected via lead 34 with a wiring path from inductance element 23 to heater 21 and that detects a grip on a steering wheel by a capacitance value of heater 21.

Since this configuration has a parallel connection of thermostat 19 and capacitor 25, capacitor 25 is conductive from the perspective of alternating current conduction. Thus, regardless of whether thermostat 19 connected to ground 29 is opened or closed, sixth connection point 55 is connected to ground 29 from the perspective of alternating current conduction. This configuration can reduce the influence of opening or closing of thermostat 19 on electrostatic sensor output.

The third exemplary embodiment will now be described in detail. The following description is primarily given on discrepancies between the first and third exemplary embodiments.

In FIG. 10, the device is conductive between positive electrode terminal 15 and heater 21 because of no thermostat 19 between the two elements. Thermostat 19 is connected with a wiring path from inductance element 23 to negative electrode terminal 17. Sixth connection point 55 between inductance element 23 and thermostat 19 is connected to negative electrode terminal 17 via capacitor 25, whereas in the first exemplary embodiment, capacitor 25 is connected with a wiring path from first connection point 31 to negative electrode terminal 17. Thus, as shown in FIG. 10, thermostat 19 and capacitor 25 are connected in parallel with each other.

A configuration of the components other than those describe above is identical to that in the first exemplary embodiment.

The operation of steering wheel grip detection device 11 at the time of opening or closing of thermostat 19 will now be described.

While thermostat 19 is opened, capacitor 25 is essentially conductive from the perspective of alternating current conduction, and thus the sixth connection point 55 side of inductance element 23 is electrically connected to ground 29 with electrostatic sensor circuit 27 used as a reference. Accordingly, the device has a capacitance value that is a combination of the capacitance values of heater 21 and inductance element 23 with electrostatic sensor circuit 27 used as a reference. While thermostat 19 is closed, sixth connection point 55 is directly connected to ground 29, and thus the device has a capacitance value that is a combination of the capacitance values of heater 21 and inductance element 23 with electrostatic sensor circuit 27 used as a reference. Consequently, regardless of whether thermostat 19 is opened or closed, the device provides steady electrostatic sensor output as shown in FIG. 3B. This configuration includes capacitor 25 connected in parallel with thermostat 19 and thus can reduce the influence of opening or closing of thermostat 19 on electrostatic sensor output although thermostat 19 is connected with the wiring path near negative electrode terminal 17.

Steering wheel grip detection device 11 implementing the configuration and operation described above can reduce the influence of opening or closing of thermostat 19 on electrostatic sensor output.

In the third exemplary embodiment, heater 21, inductance element 23, and thermostat 19 are connected with one another in this order in series wiring from positive electrode terminal 15 to negative electrode terminal 17. In this series connection, the places of inductance element 23 and heater 21 may be interchanged. FIG. 11 shows a configuration like this. FIG. 11 is identical to FIG. 10 except for the interchanged places of inductance element 23 and heater 21. The configuration of FIG. 11 has the same disposition of thermostat 19 and capacitor 25 as that in FIG. 10 and thus can reduce the influence of opening or closing of thermostat 19 on electrostatic sensor output by performing the operation described with FIG. 10. In the third exemplary embodiment, capacitor 25 is connected in parallel with thermostat 19. However, with reference to FIG. 12, capacitor 25 may be connected in parallel with both ends of a series circuit of heater 21 and inductance element 23, i.e. across a wiring path from first connection point 31 to sixth connection point 55. Operation in the case of this configuration will now be described.

While thermostat 19 is closed, sixth connection point 55 is directly connected to ground 29, and heater 21 is connected to ground 29 via power source 13. Accordingly, this device has a capacitance value that is a combination of the capacitance values of heater 21 and inductance element 23 with electrostatic sensor circuit 27 used as a reference. While thermostat 19 is opened, capacitor 25 is essentially conductive from the perspective of alternating current conduction, and thus sixth connection point 55 is electrically connected to ground 29 via capacitor 25 and power source 13. Thus, the device has a capacitance value that is a combination of the capacitance values of heater 21 and inductance element 23 with electrostatic sensor circuit 27 used as a reference. Consequently, the configuration of FIG. 12 provides steering wheel grip detection device 11 that can produce steady electrostatic sensor output regardless of whether thermostat 19 is opened or closed.

In the configuration shown in FIG. 12, the places of heater 21 and inductance element 23 may be inverted. This modified configuration as well provides steering wheel grip detection device 11 that can produce steady electrostatic sensor output regardless of whether thermostat 19 is opened or closed, owing to the same logic described with the configuration of FIG. 12 above.

The devices shown in FIGS. 10 to 12 that each have thermostat 19 near ground 29 according to the third exemplary embodiment may include a plurality of parallel-connected series circuits that are each made up of heater 21 and inductance element 23. Any of these configurations can reduce the influence of opened or closed thermostat 19 owing to the same logic described above. If any of the devices includes a plurality of the parallel-connected series circuits, capacitor 25 may be connected in parallel with both ends of the series circuits or both ends of thermostat 19.

Fourth Exemplary Embodiment

Figure 13:
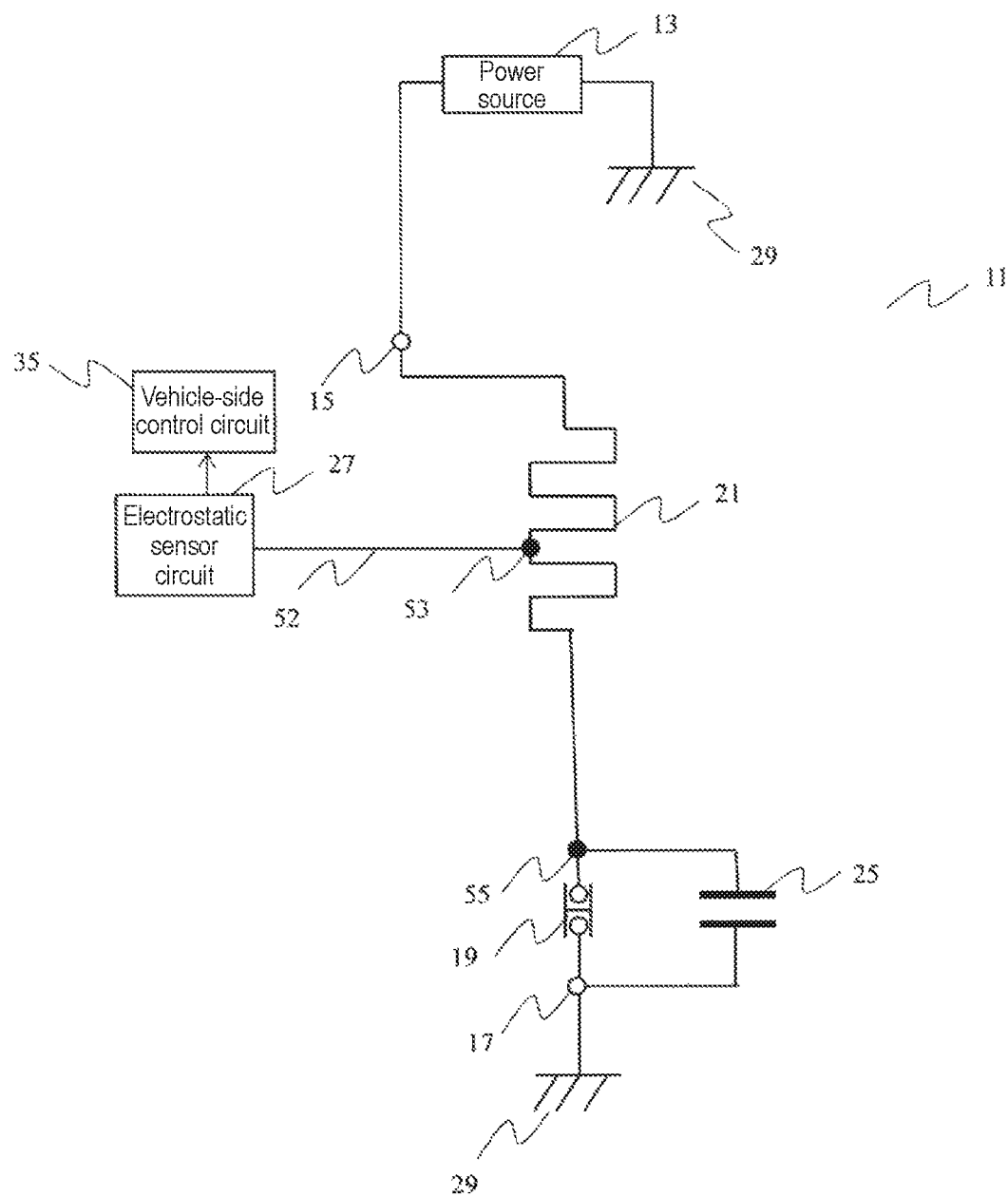
FIG. 13 is a block circuit diagram of a steering wheel grip detection device according to a fourth exemplary embodiment of the present invention.
Figure 14:
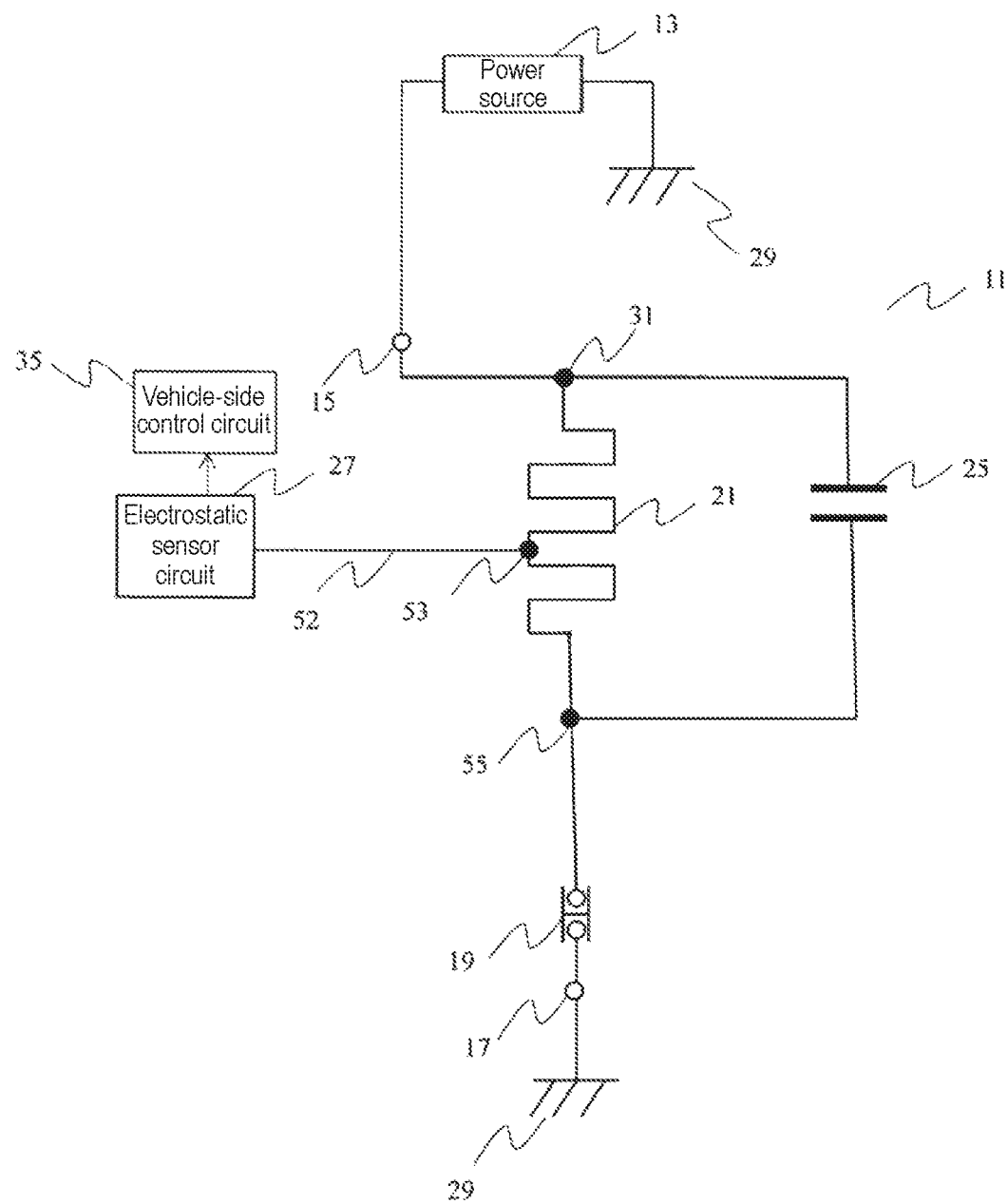
FIG. 14 is another block circuit diagram of the steering wheel grip detection device according to the fourth exemplary embodiment of the present invention.
Figure 15:
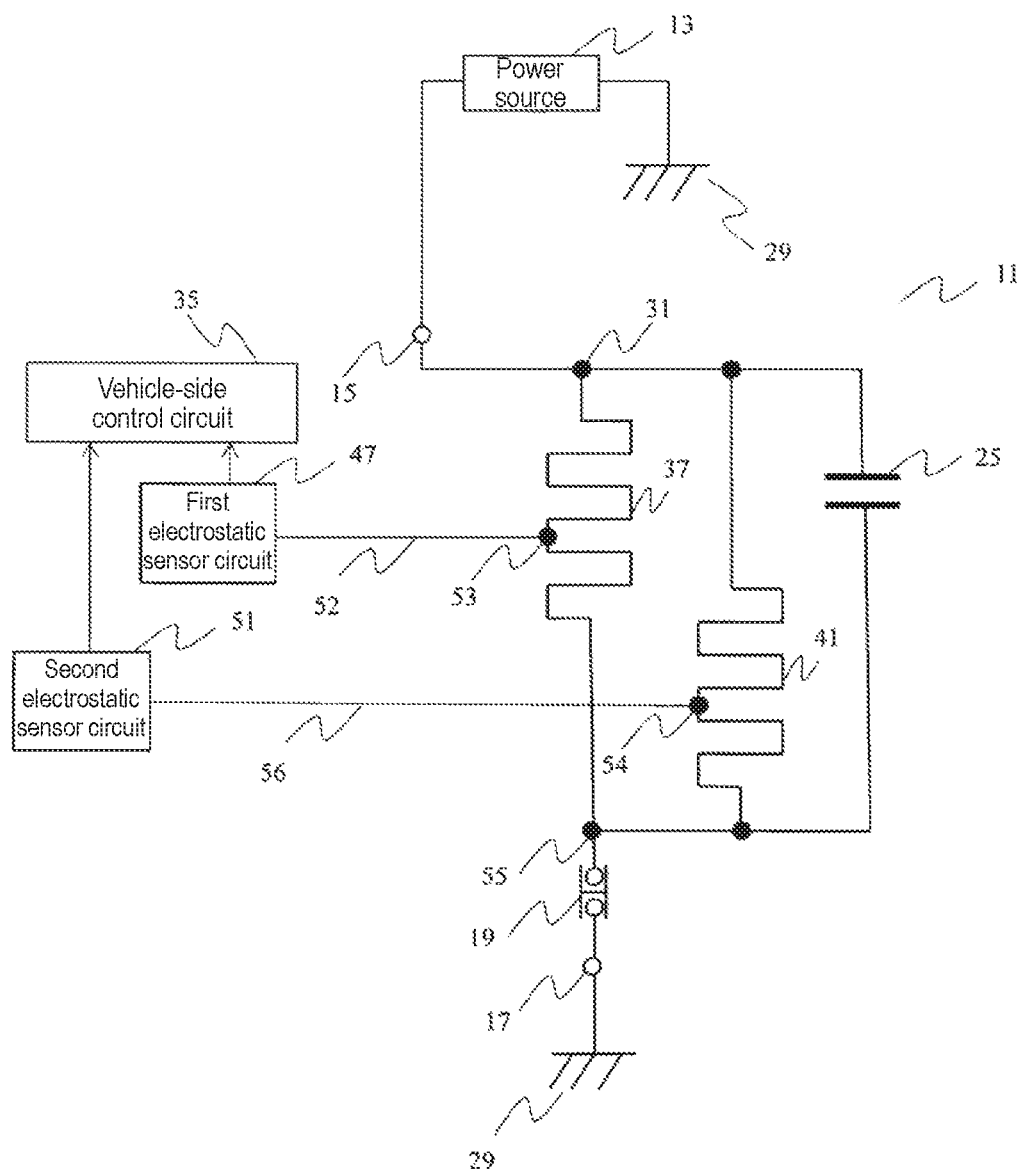
FIG. 15 is another block circuit diagram of the steering wheel grip detection device according to the fourth exemplary embodiment of the present invention.
Figure 16:
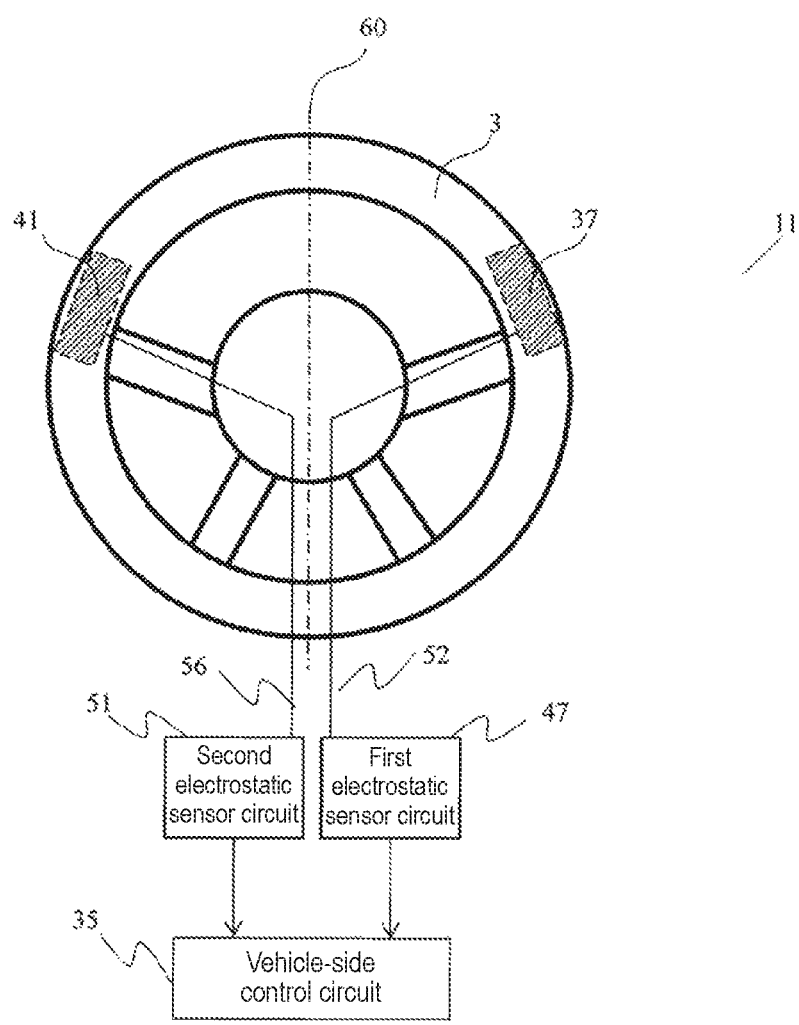
FIG. 16 is a schematic view illustrating a configuration of the steering wheel grip detection device according to the fourth exemplary embodiment of the present invention.
Figure 17:
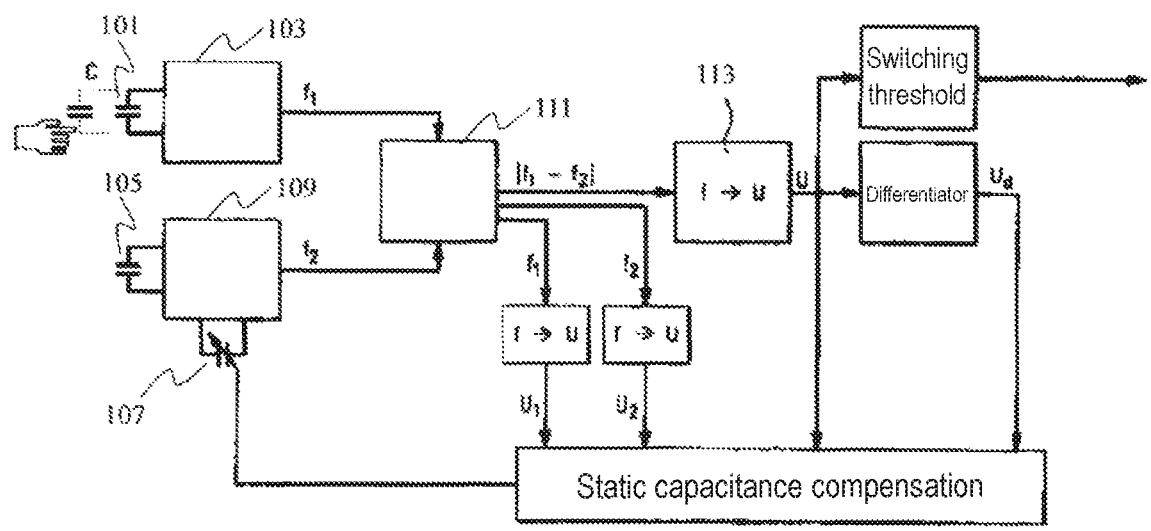
FIG. 17 is a block circuit diagram of a conventional device for detecting contact between a hand and a steering wheel.

FIG. 13 is a block circuit diagram of a steering wheel grip detection device according to a fourth exemplary embodiment of the present invention. FIG. 14 is another block circuit diagram of the steering wheel grip detection device according to the fourth exemplary embodiment of the present invention. FIG. 15 is another block circuit diagram of the steering wheel grip detection device according to the fourth exemplary embodiment of the present invention. FIG. 16 is a schematic view illustrating a configuration of the steering wheel grip detection device according to the fourth exemplary embodiment of the present invention. In the fourth exemplary embodiment, components identical to components of the first to third exemplary embodiments are denoted by the same numerals or symbols, and detailed descriptions thereof are omitted.

With reference to FIG. 13, steering wheel grip detection device 11 includes positive electrode terminal 15 electrically connected to a positive electrode of power source 13 and negative electrode terminal 17 electrically connected to a negative electrode of power source 13. Steering wheel grip detection device 11 further includes heater 21 and thermostat 19 that are electrically connected to each other in this order in series wiring from positive electrode terminal 15 to negative electrode terminal 17, as well as a capacitive element (capacitor 25) that is electrically connected in parallel with thermostat 19. Steering wheel grip detection device 11 has electrostatic sensor circuit 27 that is electrically connected via lead 52 to an intermediate point on a wiring path forming heater 21 and that detects a grip on a steering wheel by a capacitance value of heater 21.

Since this configuration has a parallel connection of thermostat 19 and capacitor 25, capacitor 25 is conductive from the perspective of alternating current conduction. This configuration can reduce the influence of opening or closing of thermostat 19 on electrostatic sensor output in like manner with the third exemplary embodiment.

The third exemplary embodiment will now be described in detail. The following description is primarily given on discrepancies between the second (FIG. 8) and fourth exemplary embodiments.

In FIG. 13, the device is conductive between positive electrode terminal 15 and heater 21 because of no thermostat 19 between the two elements. Thermostat 19 is connected with a wiring path from heater 21 to negative electrode terminal 17. Sixth connection point 55 is connected to negative electrode terminal 17 via capacitor 25 in like manner with the third exemplary embodiment. Thus, as shown in FIG. 13, thermostat 19 and capacitor 25 are connected in parallel with each other.

A configuration of the components other than those describe above is identical to that in the second exemplary embodiment. A position of fifth connection point 53 is determined as described in the second exemplary embodiment.

The operation of steering wheel grip detection device 11 at the time of opening or closing of thermostat 19 will now be described. This device has a circuit disposition of thermostat 19 and capacitor 25 similarly to that in FIGS. 10 and 11, and thus can reduce the influence of opening or closing of thermostat 19 on electrostatic sensor output as described in the third exemplary embodiment. This device includes fifth connection point 53 disposed at an intermediate point on the wiring path forming heater 21 and electrostatic sensor circuit 27 connected to fifth connection point 53 via lead 52, as well as thermostat 19 that is disposed near negative electrode terminal 17. This configuration as well can reduce the influence of opening or closing of thermostat 19 on electrostatic sensor output because capacitor 25 is connected in parallel with thermostat 19.

In like manner with the second exemplary embodiment, the fourth exemplary embodiment eliminates the need for inductance element 23. This leads to a decrease in footprint and makes the device beneficial for disposition of steering wheel grip detection device 11 into confined space in steering wheel 3.

Steering wheel grip detection device 11 implementing the configuration and operation described above can reduce the influence of opening or closing of thermostat 19 on electrostatic sensor output.

In the fourth exemplary embodiment, capacitor 25 is connected in parallel with both ends of thermostat 19. However, the disposition of capacitor 25 is not limited to this example. Capacitor 25 may be connected in parallel with both ends of heater 21. FIG. 14 shows a block circuit diagram in this instance. While thermostat 19 is closed, sixth connection point 55 is directly connected to ground 29. While thermostat 19 is opened, capacitor 25 is essentially conductive from the perspective of alternating current conduction, and thus sixth connection point 55 is electrically connected to ground 29 via capacitor 25 and power source 13. Accordingly, this device has a capacitance value that is a combination of the capacitance value of an upper half of heater 21 and the capacitance value of a lower half of heater 21 in FIG. 14 regardless of whether thermostat 19 is opened or closed, with electrostatic sensor circuit 27 used as a reference. Consequently, the configuration of FIG. 14 can reduce the influence of thermostat 19 on electrostatic sensor output.

The device of FIG. 14 may include a parallel connection of a plurality of heaters. FIG. 15 shows a block circuit diagram in this instance. A device in FIG. 15 has a configuration similar to that in FIG. 14 except for second heater 41 that is connected in parallel with first heater 37 (heater 21) and second electrostatic sensor circuit 51 that is connected to second heater 41 via lead 56. Since the devices have a common disposition of capacitor 25, the configuration of FIG. 15 can reduce the influence of opening or closing of thermostat 19 on electrostatic sensor output owing to the logic described with FIG. 14.

Likewise, the device of FIG. 13 may include a parallel connection of a plurality of heaters although no illustration is given.

FIG. 16 is a schematic view illustrating an example configuration of steering wheel grip detection device 11 that includes two heaters (first heater 37 and second heater 41) as shown in FIG. 15 and that is actually built into steering wheel 3. With reference to FIG. 16, the two (a plurality of) heaters (first and second heaters 37 and 41) are disposed symmetrical to each other with respect to center line 60 of steering wheel 3 in a neutral position. In other words, in FIG. 16 first and second heaters 37 and 41 are disposed at places that are bilaterally symmetric with respect to center line 60. This configuration enables the two heaters to warm the right and left hands of a driver more reliably. Vehicle-side control circuit 35 can determine whether the driver is holding steering wheel 3 with both hands or only one hand with high precision because steering wheel grip detection device 11 includes capacitive element 25 and thus reduces the influence of thermostat 19. As a result, vehicle-side control circuit 35 can warn the driver about a grip on steering wheel 3 while reducing the possibility of giving a false alarm.

The neutral position is a position of steering wheel 3 in which the vehicle travels in a straight line. The configuration of FIG. 16 may be applied to the devices of FIGS. 6, 7, and 9. The device may include four or more even-numbered heaters, with proviso that the corresponding heaters are disposed symmetrical to each other with respect to center line 60 of steering wheel 3 in a neutral position.

Although no illustration is given, steering wheel 3 may have a plurality of heaters circumferentially built-in. This configuration enables vehicle-side control circuit 35 to determine which regions of steering wheel 3 the driver is holding in greater detail.

INDUSTRIAL APPLICABILITY

A steering wheel grip detection device according to the present invention can reduce the influence of opening or closing of a thermostat on grip detection. Thus, the steering wheel grip detection device is especially useful as a steering wheel grip detection device or any other device that detects a hand grip on a steering wheel by a heater inside the steering wheel.

REFERENCE MARKS IN THE DRAWINGS

2: windshield
3: steering wheel
6: driver's seat
7: shift lever
8: passenger seat
11: steering wheel grip detection device
13: power source
15: positive electrode terminal
17: negative electrode terminal
19: thermostat
21, 37, 41: heater
23, 39, 43: inductance element
25, 101: capacitor (capacitive element)
27, 47, 51: electrostatic sensor circuit
29: ground
31, 33: connection point
34, 46, 50, 52, 56: lead
35: vehicle-side control circuit
53, 54, 55: connection point
60: center line
103, 109: oscillator
111: mixer
113: frequency-voltage converter

What is claimed is:

1. A steering wheel grip detection device comprising:
a first series circuit including a first heater and a first inductance element in series, the first heater being arranged between a first connecting point and a second connecting point, and the first inductance element being arranged between the second connecting point and a third connecting point;
a first lead electrically connected to the second connecting point on the first series circuit;
a thermostat connected in series with the first series circuit via the first connecting point;
a capacitive element electrically connected in parallel with the first series circuit, the capacitive element being arranged between the first connecting point and the third connecting point; and a first electrostatic sensor circuit that is electrically connected to the first lead and that detects contact with a steering wheel by a capacitance value of the first heater.

2. The steering wheel grip detection device according to claim 1, further comprising:

second series circuit in parallel with the first series circuit, the second series circuit including a second heater and a second inductance element in series, the second heater being arranged between a fourth connecting point and a fifth connecting point, and the second inductance element being arranged between the fifth connecting point and a sixth connecting point;

a second lead electrically connected to the fifth connection point on the second series circuit; and second electrostatic sensor circuit that is electrically connected to the second lead and that detects contact with the steering wheel by a capacitive value of the second heater.

3. A steering wheel grip detection device comprising:

a first heater, the first heater being arranged between a first connecting point and a third connecting point;

a first lead electrically connected to the heater at an intermediate position of the first heater, the intermediate position being a second connecting point;

a thermostat connected in series with the first heater via the first connecting point;

a capacitive element electrically connected in parallel with the first heater and the thermostat, the capacitive element being arranged between the first connecting point and the third connecting point; and a first electrostatic sensor circuit that is electrically connected to the first lead and that detects contact with a steering wheel by a capacitance value of the first heater.

4. The steering wheel grip detection device according to claim 3, further comprising:

a second heater, the second heater being arranged between a fourth connecting point and a sixth connecting point;

a second lead electrically connected to a fifth point on which is intermediately positioned a wiring included in the second heater; and a second electrostatic sensor that is electrically connected to the second lead and that detects contact with the steering wheel by a capacitance value of the second heater.

5. The steering wheel grip detection device according to claim 2, wherein the first heater and the second heater are disposed symmetrical to each other with respect to a center line of the steering wheel in a neutral position.

6. The steering wheel grip detection device according to claim 4, wherein the first heater and the second heater are disposed symmetrical to each other with respect to a center line of the steering wheel in a neutral position.

* * * * *